United States Patent [19]

Gorski et al.

[11] 4,387,512
[45] Jun. 14, 1983

[54] PASTA GAUGE AND CONTAINER

[76] Inventors: Carol A. Gorski; Saul B. Gorski, both of 123 S. Blanchard St., Wheaton, Ill. 60187

[21] Appl. No.: 214,036

[22] Filed: Dec. 8, 1980

Related U.S. Application Data

[63] Continuation-in-part of Ser. No. 32,509, Apr. 23, 1979, Pat. No. 4,334,361.

[51] Int. Cl.³ ............................ G01B 5/00; B65D 5/72
[52] U.S. Cl. .................................. 33/174 T; 206/443; 229/7 SC
[58] Field of Search ................. 33/1 V, 1 F, 174 R, 33/174 T, 174 H, 121; 73/426, 429; 229/7 R, 7 SC, 11, 17 M, 17 SC; 426/394; 220/351; 206/443, 524.1

[56] References Cited

U.S. PATENT DOCUMENTS

| 2,674,888 | 4/1954 | Simonet | 33/121 |
| 3,110,436 | 11/1963 | Wagner | 229/7 SC |
| 3,874,085 | 4/1975 | Atkins | 33/174 T |
| 4,120,094 | 10/1978 | Pfaelzer | 33/174 T |
| 4,165,565 | 8/1979 | Cloutier et al. | 33/174 T |

FOREIGN PATENT DOCUMENTS

| 248952 | 8/1966 | Fed. Rep. of Germany | 220/351 |
| 1148328 | 12/1957 | France | 220/351 |
| 383838 | 11/1932 | United Kingdom | 73/429 |

*Primary Examiner*—Richard R. Stearns
*Attorney, Agent, or Firm*—Edmond T. Patnaude

[57] ABSTRACT

A gauge and container for elongated, dried pasta includes an open end over which a metering cover is adjustably positionable to expose an opening of predetermined size through which a corresponding predetermined quantity of pasta may flow.

4 Claims, 4 Drawing Figures

PASTA GAUGE AND CONTAINER

The present application is generally related to the art of selecting a predetermined amount of elongated dried pasta members from a supply thereof, and is a continuation-in-part of copending application Ser. No. 32,509, filed Apr. 23, 1979 and now U.S. Pat. No. 4,334,361.

BACKGROUND OF THE INVENTION

Devices and methods for selecting predetermined amounts or portions of elongated, dried pasta, such as spaghetti, are known in the prior art. See, for example, U.S. Pat. No. 3,874,085—Atkins disclosing a gauge in the form of a horizontal plate having a plurality of circular holes of different diameters; U.S. Pat. No. 4,120,094—Pfaelzer disclosing a gauge in the form of a vertical member having a V-shaped notch; and U.S. Pat. No. 4,165,565—Clantier et al., disclosing a gauge having a plurality of measuring troughs of respectively differing sizes. All of these prior art gauges require the user to hold and manipulate the pasta members during the metering operation. Because spaghetti and similar pasta shapes are very fragile, they are easily broken when using these gauges.

It would be desirable to provide a combination container and gauge wherein selected amounts or portions of the pasta can be easily removed from a container containing a supply of the pasta without physically handling the pasta which is removed from the container or which remains therein. The unused pasta will simply remain in the container for storage for later use wherefor the chances of breakage and spillage will be minimized. The use of such a gauge will eliminate the breakage and subsequent cleanup generally associated with the apportioning of spaghetti types of dried pasta. Moreover, by obviating the need to physically hold the pasta during the metering operation a more precise selection of the desired quantity of pasta can be made.

SUMMARY OF THE INVENTION

Briefly, in accordance with one aspect of the present invention there is provided a new and improved pasta gauge in the form of an elongated box having one open end over which a cover is movably mounted for exposing a selected portion of said opening so that when the box is tilted downwardly toward the opening, the elongated, dried pasta contained in the box and not blocked by the cover slide out through the opening. During the metering step the pasta is held only by the box wherefor the measurement is not affected by the manner in which the box is held nor, as in the prior art, by the extent to which the bundle of pasta is compressed by the user. Preferably, the pasta is poured from the metering opening in the container directly into a cooking vessel thereby further eliminating all physical handling of the pasta and the likelihood of breakage.

The box is provided with a series of graduations or other indicia along one side wall in proximity to the cover so that the person using the gauge may position the cover relative to a selected one of the graduations and thereby dispense from the box a corresponding amount of pasta.

In order to permit use of the gauge with pasta members of different length, a series of graduations or other indicia is provided along the length of the box, and the box is at least partially transparent to permit a visual measurement of the length of the pasta contained in the box.

GENERAL DESCRIPTION OF THE DRAWING

The present invention will be better understood by a reading of the following detailed description taken in connection with the accompanying drawing wherein.

DETAILED DESCRIPTION OF THE INVENTION

Figure 1:
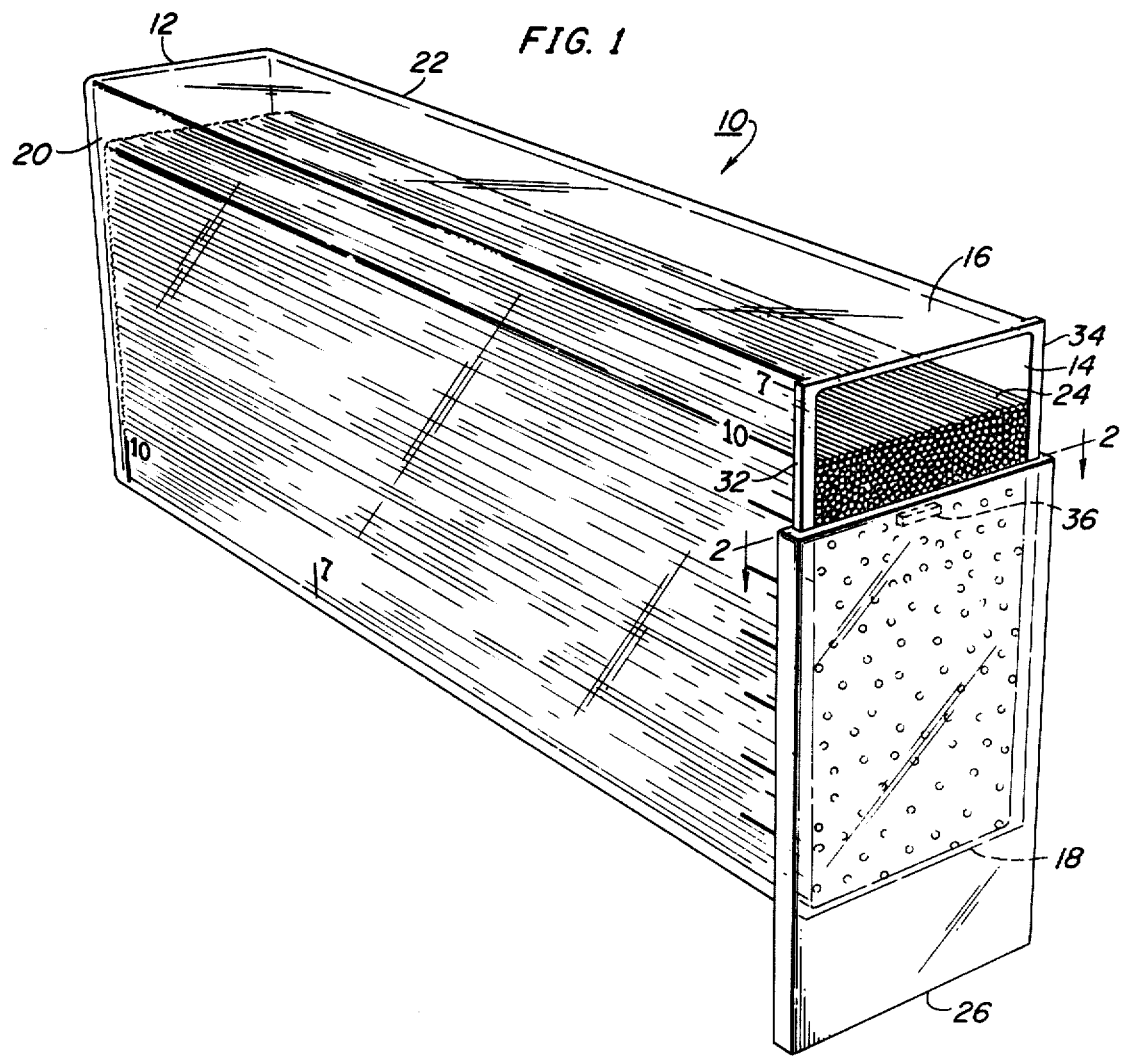
FIG. 1 is a perspective view of a pasta gauge and container embodying the present invention.
Figure 2:
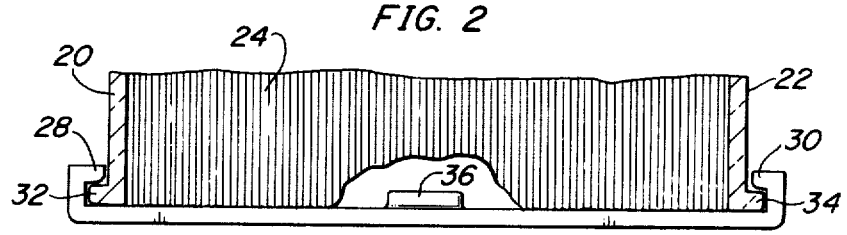
FIG. 2 is a cross-sectional view taken along the line 2—2 of FIG. 1.
Figure 3:
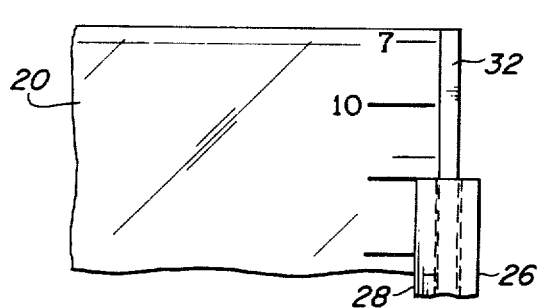
FIG. 3 is a fragmentary, enlarged view of the upper, front left corner of the pasta gauge and container as shown in FIG. 1.
Figure 4:
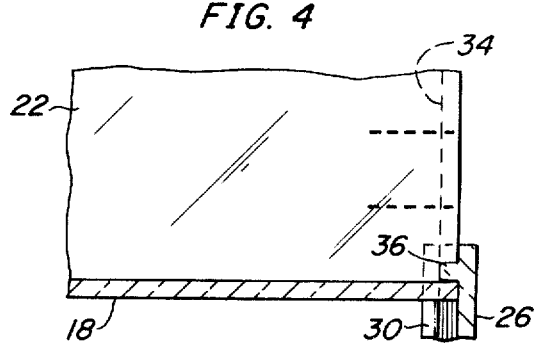
FIG. 4 is a cross-sectional fragmentation view showing the metering cover in a fully open position.

Referring particularly to FIG. 1 of the drawings, a pasta gauge and container 10 is in the form of a rectangular box which is closed at the rear end 12 and open at the front end 14. The box has parallel top and bottom planar walls 16 and 18 and parallel planar side walls 20 and 22 aligned perpendicular to the top and bottom walls, whereby the inside of the box is rectangular in cross section. The inner walls of the box which define the rectangular opening therein terminate at the opening 14 so that elongated pasta members 24 disposed in the box may slide freely out of the opening 14 when the box is tilted downwardly.

In order to close the box during storage of pasta therein, a cover member 26 is mounted over the open end 14. The cover 26 is also used as a metering device to selectively adjust the size of the opening through which the pasta members 24 may be dispensed from the container, and to that end the cover 26 is provided with lips 28 and 30 along its side edges which overlie external flanges 32 and 34 provided immediately adjacent the opening 14 on the side walls of the container. The box is preferably a unitary plastic member which may be injection molded or manufactured in any other suitable manner. The cover member 26 is also preferably formed of a plastic material such as polystyrene and is relatively rigid although sufficiently flexible so that it can be snapped in place over the flanges 32 and 34. It may thus be seen that the cover 36 is slidable across the opening 14 at one end of the box.

In order to prevent spurious disassembly of the metering cover 26 from the box, a small protuberance 36 may be provided on the inner face of the cover as shown in the drawings. The protuberance 36 is spaced from the top edge of the cover by a distance equal to the wall thickness of the top 16 of the box so that when the cover is in the fully closed position the protuberance 36 engages the inner wall of the top 16. It will be understood that the protuberance 36 is not necessary, and if desired, other means may be used to prevent complete spurious disassembly of cover 26 from the box.

The box illustrated in the drawings is for use with different lengths of pasta and is shown, by way of example only, for use with seven inch and ten inch pasta. Accordingly, two graduations respectively marked 7 and 10 are provided along the length of the box on one side thereof. At least the portion of the side wall 20 is transparent so that the pasta in the box can be viewed and its length determined by observation relative to the graduation marks on the side thereof. In addition, two sets of graduation marks are provided along one side of the box in proximity to the cover 26. These graduations facilitate the positioning of the cover relative to the box so as to dispense a desired number of serving portions from the supply of pasta contained within the box.

In using the pasta gauge and container of the present invention, a supply of pasta members 24 is manually loaded into the container and may be stored therein until it is to be used. At the time it is to be used the person desiring to use the pasta will place the container in the approximate position shown in FIG. 1 and note the level of pasta members therein. As shown, the level of pasta is at the upper graduation mark 10. The person then determines the number of serving portions to be dispensed from the box and slides the cover down until its upper edge is aligned with the appropriate graduation mark. For example, if the pasta is ten inches long and the supply is aligned with the upper graduation mark 10 in FIG. 1, one serving portion will be dispensed for each of the heavy graduation lines corresponding to ten inches. As shown, the cover is positioned to dispense one serving portion of ten inch pasta. With the metering cover in the selected position, the user then tilts the open end downward so that the pasta members located above the upper edge of the cover 26 will slide out of the box. By holding the box above the cooking vessel at this time the pasta members slide directly into the vessel whereby no physical handling thereof is required. Moreover, the pasta members which are not thereby dispensed into the cooking vessel remain in the box. The box can then be inverted into an upright position with the opening at the top and the cover slid into the closed position.

Preferably, the flanges 32 and 34 and the space between the lips 28 and 30 and the inner face of the cover 26 is selected so that there is a small amount of friction provided between the cover and the box to prevent spurious opening of the cover and also to facilitate holding the cover in the selected metering position during the pasta dispensing operation.

While the present invention has been described in connection with a particular embodiment thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed is:

1. A pasta gauge and container for holding a supply of elongated, dried pasta members and for removing selected, predetermined amounts of said pasta members therefrom comprising an elongated box having top and bottom mutually parallel, planar walls, a pair of mutually parallel, planar side walls, and an end wall affixed to said walls at one end of said box, the other ends of said walls providing a rectangular opening at the other end of said box, a generally planar cover and gauge member slidably mounted to said box over said rectangular opening for movement between a closed position completely covering said opening and a plurality of other positions only partially covering said opening, said cover when in said other positions defining with said side walls and one of said top and bottom walls a rectangular opening through which a selected amount of said pasta members may be poured out of said box, and indicia provided on at least one of said sidewalls in proximity to said other end for providing a visible indication of the amount of pasta members selected by the position of said cover.

2. A pasta gauge and container according to claim 1 comprising stop means extending into said box from said cover for abutting said top and bottom walls to maintain said cover in assembled relationship with said box.

3. A pasta gauge and container according to claim 2 comprising cooperating means on said cover and the external sides of said side walls for slidably connecting said cover to said box.

4. A method of removing a selected amount of elongated, dried pasta members from a supply of said members, comprising the steps of placing said supply of pasta members in an elongated box having an open end covered by a cover selectively positionable between the top and bottom walls of said box, wherein one end of said cover and the ends of the top and side walls of said box define an opening, and said box is provided with indicia along one side thereof in proximity to said open end, said pasta members being positioned in said box in mutually parallel relationship and directed toward said open end, orienting said box so that said members are at least partially supported by said bottom wall, positioning said cover at a selected position partially exposing said open end of said box by aligning a horizontal edge of said cover with a selected one of said indicia, and tilting said box downwardly toward said open end whereby a selected amount of said pasta members slide out of said box through said open end.

* * * * *